V. ANSLEY & J. W. WEAVER.
Stalk-Cutters.
No. 142,187.　　　　　　　　　Patented August 26, 1873.
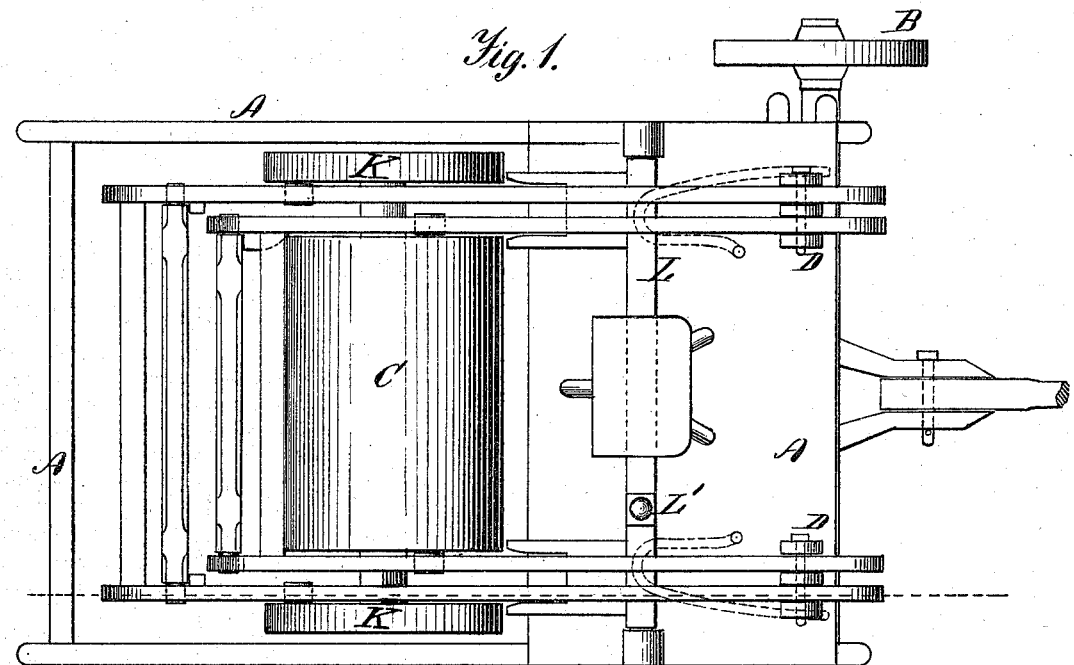
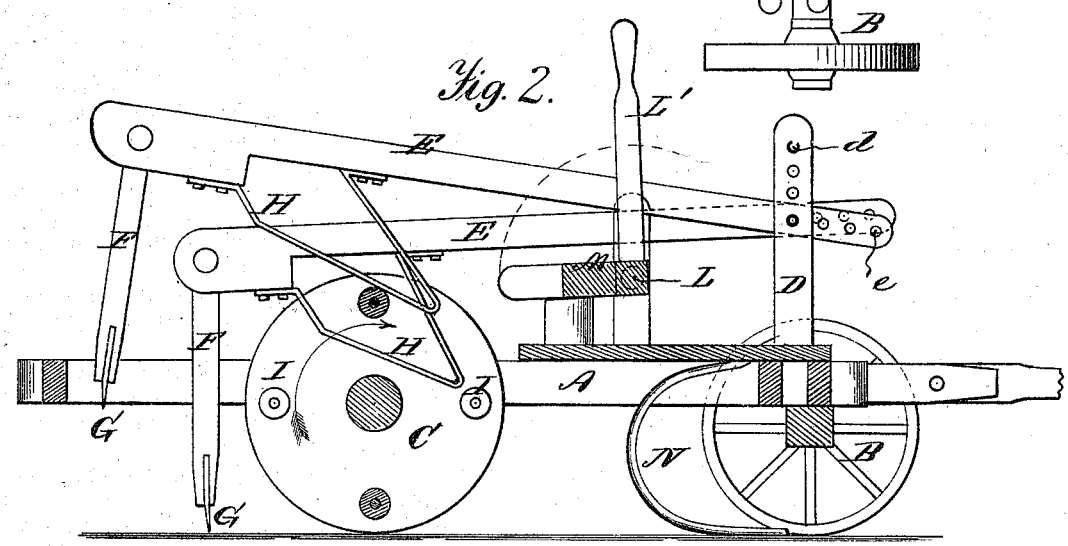
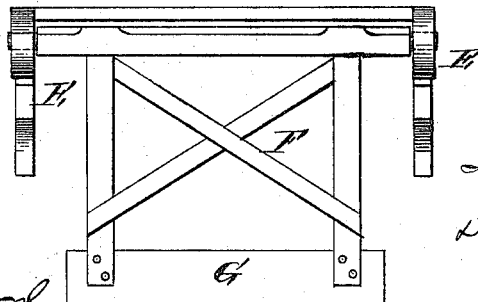

UNITED STATES PATENT OFFICE.

VANVLIET ANSLEY AND JOHN W. WEAVER, OF MORRISON, ILLINOIS.

IMPROVEMENT IN STALK-CUTTERS.

Specification forming part of Letters Patent No. 142,187, dated August 26, 1873; application filed June 28, 1873.

*To all whom it may concern:*

Be it known that we, VANVLIET ANSLEY and JOHN W. WEAVER, of Morrison, in the county of Whitesides and State of Illinois, have invented certain Improvements in Stalk-Cutters, of which the following is a specification:

This invention relates to that class of stalk-cutters which are composed in the main of guide-rods for straightening the stalks, a roller for crushing them, and knives for cutting them into short lengths, all the parts being mounted upon a suitable frame-work, constituting a machine which can be drawn over a field to do its work. Our improvement consists in the employment of a series of swinging drop-knives, attached, so as to operate in rear of the crushing-roller, to a corresponding number of independent oscillating frames, which are adjustably hung on suitable standards, so that the stroke of the knives can be regulated, and which are alternately operated through the medium of cams. A lift-bar is also provided for supporting the knife-frames in an elevated position to throw them out of action.

Figure 1 is a plan view of our improved machine. Fig. 2 is a longitudinal sectional elevation. Fig. 3 is an end view of one of the drop-knives and its frame.

The same letters of reference are used in all the figures in the designation of identical parts.

The main frame A is at its front end supported upon a two-wheeled truck, B, and at its rear end upon the axle of the crushing-roller C. Upon the front end of the frame are erected standards D, to which the respective knife-frames E are pivoted, the standards being provided with a vertical series of holes, $d$, to permit of vertical adjustment of this end of the knife-frames. These knife-frames, arranged within one another, as shown in Fig. 1, extend rearward beyond the crushing-roller, and each carries at its rear end a pendent swinging sash, F, provided at its lower end with a blade, G. The knife-frames are of different lengths, and are severally provided with angular downwardly-projecting bars H, forming cams which are acted upon by laterally-projecting studs I on the ends of the crushing-roller, and the disks K fixed to the axle of the roller. The studs I are arranged to lift the knife-frames alternately, and their number and the relative position of the cutters is such that the stalks will be cut into lengths of one foot. Provision is, however, made by a series of holes, $e$, in the forward ends of the knife-frames, permitting of their longitudinal adjustment, to enable the operator to so adjust the machine as to cut stalks into any desirable lengths. After the knives have made a stroke, they swing or oscillate on their frames, so as not to impede the forward movement of the machine, as would be the case were they rigidly secured to their frames. A lift-bar, L, extending across the machine near the driver's seat, and turning in suitable bearings, is provided to elevate the knife-frames by means of arms M to such a height that their cams H will be out of the paths of the revolving studs I. Guide-rods N are employed, as usual, to straighten the stalks before they are borne down by the crushing-roller. The lift-bar L is operated by a hand-lever, L'.

We have shown two cutters only, but more may be employed.

What we claim as our invention, and desire to secure by Letters Patent, is—

1. In a stalk-cutter, a drop-knife, hinged to the frame by which it is carried, substantially as and for the purpose specified.
2. The combination of the frames E, carrying hinged or oscillating knives, cams H, and revolving studs I, substantially as and for the purpose specified.
3. A series of knife-frames, E, longitudinally adjustable with reference to one another, substantially as and for the purpose specified.
4. The combination of the guide-rods N, crushing-roller C, knife-frames E provided with oscillating knives, cams H, and revolving studs I, substantially as specified.

In testimony whereof we have signed our names to this specification in the presence of two subscribing witnesses.

VANVLIET ANSLEY.
JOHN W. WEAVER.

Witnesses:
P. EDW. J. EILS,
FRANK CLENDENIN.